US011383223B2

(12) United States Patent
Schoneborn et al.

(10) Patent No.: US 11,383,223 B2
(45) Date of Patent: Jul. 12, 2022

(54) NOX TRAP CATALYST SUPPORT MATERIAL COMPOSITION

(71) Applicant: Sasol Germany GmbH, Hamburg (DE)

(72) Inventors: Marcos Schoneborn, Hamburg (DE); Dirk Niemeyer, Halstenbek (DE); Thomas Harmening, Munster (DE); Sandra Fibikar, Brunsbuttel (DE)

(73) Assignee: Sasol Germany GmbH, Hamburg (DE)

( * ) Notice: Subject to any disclaimer, the term of this patent is extended or adjusted under 35 U.S.C. 154(b) by 277 days.

(21) Appl. No.: 16/603,738

(22) PCT Filed: May 3, 2018

(86) PCT No.: PCT/EP2018/061427
§ 371 (c)(1),
(2) Date: Oct. 8, 2019

(87) PCT Pub. No.: WO2018/202815
PCT Pub. Date: Nov. 8, 2018

(65) Prior Publication Data
US 2020/0038841 A1 Feb. 6, 2020

(30) Foreign Application Priority Data
May 5, 2017 (EP) .................... 17169828

(51) Int. Cl.
*B01J 23/10* (2006.01)
*B01D 53/94* (2006.01)
(Continued)

(52) U.S. Cl.
CPC .......... *B01J 23/10* (2013.01); *B01D 53/9422* (2013.01); *B01J 23/005* (2013.01);
(Continued)

(58) Field of Classification Search
CPC ...... B01J 23/10; B01J 23/005; B01J 35/1014; B01J 35/1038; B01J 35/1042;
(Continued)

(56) References Cited

U.S. PATENT DOCUMENTS 5,422,332 A * 6/1995 Demmel .................. B01J 23/10
423/244.04
5,503,814 A * 4/1996 Demmel .................. B01J 23/10
208/113
(Continued)

FOREIGN PATENT DOCUMENTS

CN        1247449    *  3/2006   ............. C01B 13/18
CN     10 3127925   *  6/2013   ............. B01J 23/10
(Continued)

OTHER PUBLICATIONS

Li-li Guo et al., "Effect of Mg/Al molar ratios on NO reduction activity of Co using Ce—La/MgAl2O4-x catalysts." Journal of Fuel Chemistry and Technology, vol. 45, Issue 6, pp. 723-730. (Year: 2017).*

(Continued)

Primary Examiner — Patricia L. Hailey
(74) Attorney, Agent, or Firm — Bushman Werner, P.C.

(57) ABSTRACT

The present invention relates to a method of making a support material composition comprising an Mg/Al oxide, a cerium oxide and at least another rare earth element oxide, to a support material composition and to the use of the support material composition as a nitrogen oxide storage component within a catalyst for treating exhaust gases to reduce NOx content.

17 Claims, 1 Drawing Sheet

(51) Int. Cl.
*B01J 23/00* (2006.01)
*B01J 35/10* (2006.01)
*B01J 37/00* (2006.01)
*B01J 37/04* (2006.01)
*B01J 37/08* (2006.01)
*C01F 7/162* (2022.01)
*F01N 3/28* (2006.01)

(52) U.S. Cl.
CPC ....... *B01J 35/1014* (2013.01); *B01J 35/1038* (2013.01); *B01J 35/1042* (2013.01); *B01J 35/1047* (2013.01); *B01J 37/0045* (2013.01); *B01J 37/04* (2013.01); *B01J 37/08* (2013.01); *C01F 7/162* (2013.01); *F01N 3/2832* (2013.01); *B01D 2255/1021* (2013.01); *B01D 2255/91* (2013.01); *B01D 2255/9207* (2013.01); *F01N 2370/02* (2013.01)

(58) Field of Classification Search
CPC .... B01J 35/1047; B01J 37/0045; B01J 37/04; B01J 37/08; B01D 53/9422; B01D 2255/1021; B01D 2255/91; B01D 2255/9207; C01F 7/162; F01N 3/2832; F01N 2370/02
USPC .......................................... 502/302, 341, 524
See application file for complete search history.

(56) References Cited

U.S. PATENT DOCUMENTS

| | | | | |
|---|---|---|---|---|
| 5,545,604 A | * | 8/1996 | Demmel | ................ C10G 11/04 |
| | | | | 502/414 |
| 2004/0209770 A1 | * | 10/2004 | Nakatsuji | ................ B01J 23/63 |
| | | | | 502/302 |
| 2005/0207956 A1 | * | 9/2005 | Vierheilig | .......... B01D 53/8637 |
| | | | | 423/213.2 |
| 2009/0023581 A1 | * | 1/2009 | Di Monte | ............... C01F 7/168 |
| | | | | 502/263 |
| 2009/0062117 A1 | * | 3/2009 | Kluge | ..................... B01J 23/10 |
| | | | | 502/304 |
| 2013/0156668 A1 | * | 6/2013 | Spurk | ................... F01N 3/2066 |
| | | | | 423/213.2 |

FOREIGN PATENT DOCUMENTS

| | | |
|---|---|---|
| EP | 3067319 | 9/2016 |
| WO | 2015/100313 | 7/2015 |
| WO | 2016142058 | 9/2016 |

OTHER PUBLICATIONS

M. F. Wilkes et al., "Catalytic studies on ceria lanthana solid solutions I. Oxidation of methane." Journal of Catalysis 219, pp. 286-294. (Year: 2003).*

* cited by examiner

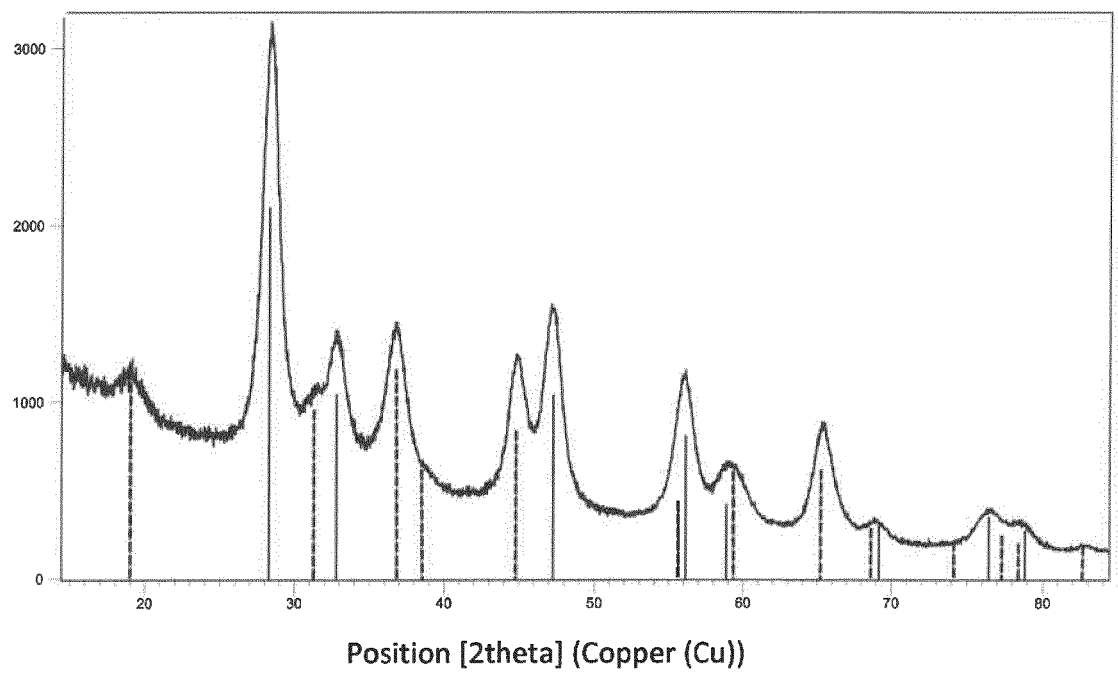

NOX TRAP CATALYST SUPPORT MATERIAL COMPOSITION

The present invention relates to a method of making a support material composition, to a support material composition, and to the use of the support material composition as a nitrogen oxide storage component applicable in catalysts for treating exhaust gases, for example from lean-burn engines.

BACKGROUND

To abate the NOx content in the exhaust gas of lean-burn gasoline or diesel engines, designated NOx after-treatment systems are required. This is because the reduction of NOx to $N_2$ in a three-way catalyst operating under the prevailing oxidizing conditions is not possible. Therefore, a special exhaust gas after-treatment catalyst, has been developed containing a material that is able to store NOx, e.g. as a nitrate for example under lean conditions. By applying short stoichiometric or rich operation conditions the stored NOx can then be converted to nitrogen and the storage material regenerated. This catalyst is commonly called a NOx-trap catalyst and is described for example in EP1317953 B1.

As stated in EP1317953 B1 a NOx-trap catalyst contains nitrogen oxides storage components, deposited on suitable support materials in a highly dispersed manner in order to create a large area of interaction with the exhaust gas. Materials that are able to store nitrogen oxides in the form of nitrates are for example the oxides, carbonates or hydroxides of alkaline earth metals, particularly of Barium.

A suitable support material has to provide on top of the ability to effectively store NOx compounds a high specific surface area and a high thermal stability to ensure long-term durability of the final catalyst. Furthermore, the chemical composition and properties of the support material influence the nitrogen oxide conversion efficiency and the temperature operation window of the NOx-trap catalyst.

A support material including these properties, that is well described in the art, is a homogenous Mg/Al mixed oxide, with a magnesium oxide concentration of 1 to 40 wt. % based on the total weight of the oxide.

The term Mg/Al mixed oxide describes a mixture of the two oxides on an atomic scale and therefore excludes a physical mixture of the two individual oxides as well as materials prepared by impregnation of aluminum oxide with a magnesium oxide precursor solution. This type of Mg/Al mixed oxide is preferably obtained by calcination of a Mg/Al mixed oxide precursor, that is obtained via a hydrolysis of a mixture of the alkoxides that is described in detail in DE19503522 A1.

Further improvements of the storage capability activity of a NOx-trap catalyst are achieved by the addition of cerium oxide. This is because cerium oxide has the capacity to store NOx at low temperatures.

However, cerium oxide is known to be very sensitive in terms of thermal degradation as it tends to undergo severe sintering under high temperature conditions that may for example occur during catalyst or particle filter regeneration cycles. The thermal sintering is accompanied by an increase of cerium oxide crystal size (as determined from powder XRD patterns by the Scherrer equation) which leads to a decrease of specific surface area and finally deterioration of the low temperature NOx storage capacity. Therefore, a thermal stabilization of the cerium oxide is needed.

WO2015100313 A1 teaches the combined addition of cerium oxide and praseodymium oxide to a Mg/Al mixed oxide. However as per WO2015/100313 A1 three distinct phases are formed and therefore the rare earth element (praseodymium) cannot be fully utilized for thermal stabilization of the cerium oxide and furthermore, WO2015100313 A1 applies—different from the present invention—a precipitation reaction.

An object of the present invention is therefore to provide a new method of making a support material composition as well as a support material composition applicable in NOx trap catalysts with enhanced thermal stability and enhanced nitrogen oxide storage capabilities, in particular at higher temperatures.

SUMMARY OF THE INVENTION

According to a first aspect of the invention there is provided a method of preparing a support material composition comprising at least the following steps:
i) preparing an aqueous suspension of a Mg/Al mixed oxide precursor;
ii) preparing an aqueous solution of a cerium salt;
iii) preparing an aqueous solution of a one or more rare-earth element salt(s) other than cerium salts;
iv) combining, in any order, at least the aqueous suspension of step i), with the aqueous solution of step ii), and the aqueous solution of step iii) to form an aqueous mixture;
v) drying the aqueous mixture to form a dried particulate material such as a powder; and
vi) calcining the dried particulate material,
wherein the content of the one or more rare-earth element salt(s) other than cerium is between 5 and 50 wt. %, preferably between 10 wt. % and 35 wt. %, relative to the sum of
the cerium salts from the aqueous solution of step ii) and
the rare earth element salt(s) other than cerium salts from the aqueous solution of step iii) and,
wherein each of the salts are calculated as their oxides.

According to a second aspect of the invention there is provided a support material composition obtainable according to the first aspect of the invention.

According to a third aspect of the invention there is provided a support material composition comprising at least two phases:
i) a first phase comprising a Mg/Al mixed oxide; and
ii) a second phase comprising a cerium based oxide, and at least one rare-earth element based oxide other than cerium oxide;

the content of the first phase being at least 50 wt. % of the total support material composition, wherein the amount of Mg in the first phase is between 1 and 40 wt. %, calculated as MgO based on the weight of the first phase, calculated as MgO and $Al_2O_3$. The second phase is preferably a solid solution. The support material composition of the third aspect of the invention is for example obtainable according to the first aspect of the invention.

According to a fourth aspect of the invention there is provided the use of the support material composition according to the second or third aspect of the invention as a nitrogen oxide storage component within a catalyst for treating exhaust gases.

DETAILED DESCRIPTION OF THE INVENTION

The Mg/Al mixed oxide precursor may be prepared by known methods in the art of the invention, for example by hydrolysis of a mixture of corresponding alkoxides of aluminium and magnesium yielding a mixture of a hydrotalcite (in the context of this specification, hydrotalcite means a Mg/Al layered double hydroxide), and boehmite.

A preferred aqueous suspension of a Mg/Al mixed oxide precursor is prepared by the method described in DE19503522 A1 (incorporated herein by reference). DE19503522 A1 describes a process for producing high-purity Mg/Al mixed oxide precursors by reacting alcohols or alcohol mixtures with magnesium and aluminium metal and hydrolyzing the resultant alcoholate mixture with water. The mixture obtained by this process comprises hydrotalcite, boehmite, and water and is preferably used in the present invention as an aqueous suspension of a Mg/Al mixed oxide precursor of step i) of the invention. In order to promote the co-production of boehmite beside the layered oxide hydrates, aluminium Is used in excess relative to the stoichiometry of the co-produced layered oxide hydrates (for the magnesium/aluminium ratio that can be used see page 3, lines 16-20 of DE19503522 A1).

The amount of Mg in the aqueous suspension of the Mg/Al mixed oxide precursor is preferably between 1 and 40 wt. % calculated as MgO based on the total amount of Mg/Al mixed oxide added, calculated as MgO and $Al_2O_3$.

The cerium salt is soluble in an aqueous solution, and includes cerium nitrate, ammonium cerium nitrate, cerium sulfate, cerium carbonate, and cerium acetate. Preferably, the cerium salt is cerium acetate. The cerium salt is added to an aqueous solution including water to form an aqueous solution of a cerium salt.

The rare-earth element salt(s) other than cerium salts is a salt soluble in an aqueous solution selected from salts of La, Pr, Nd, Y, Sm or mixtures thereof. Preferably, the rare-earth element salt(s) other than cerium salts is an acetate of La, Pr, Nd, Y, Sm or mixtures thereof. The rare earth element salt(s) other than cerium salts is added to an aqueous solution including water to form an aqueous solution of the rare-earth element salt(s) other than cerium salts.

Preferably the aqueous solution of the cerium salt and the aqueous solution of one or more rare-earth element salt(s) solution other than cerium salts are mixed together before being combined with the suspension I.e. at least the solutions of step ii) and step iii) are first combined to form a mixed aqueous solution of the cerium salt and the rare-earth element salt(s) other than cerium salts and then are combined with the suspension of step i).

The amount of Mg/Al mixed oxide precursor in the mixture of the suspension and the solutions is between 50 and 95 wt. % calculated as the sum of MgO and $Al_2O_3$ based on the dry weight of the total weight of the aqueous mixture calculated as the respective oxides in their common oxidation state. The combined amount of cerium salt, and rare-earth element salt(s) other than cerium is between 5 and 50 wt. % calculated as the sum of respective oxide(s) based on the dry weight of the total weight of the aqueous mixture, each in their common oxidation state.

The aqueous mixture is then dried to form a particulate material by common methods known in the art for example by spray drying to form a powder.

Finally, the particulate material is calcined at a temperature of between 500° C. and 1100° C., preferably between 800° C. and 1000° C. for a period of between 30 minutes and 5 hours to obtain the support material composition.

According to a second aspect of the invention there is provided a support material composition that can be prepared according to the method of the Invention.

According to a third aspect of the Invention, there is provided a support material composition comprising at least two phases:
 i) first phase comprising a Mg/Al mixed oxide; and
 ii) a second phase comprising a cerium based oxide, and a rare-earth element(s) based oxide other than cerium oxide;
the content of the first phase being at least 50 wt. % of the total support material composition wherein the amount of Mg in the first phase is between 1 and 40 wt. % calculated as MgO based on the weight of the first phase, calculated as MgO and $Al_2O_3$. The Mg/Al mixed oxide may Include spinel ($MgAl_2O_4$), alumina, and MgO, preferably spinel ($MgAl_2O_4$) and alumina.

The second phase is preferably a solid-solution of at least cerium oxide, and one or more rare-earth element(s) oxide other than cerium oxide.

The content of the second phase is between 5 to 50 wt. % of the total support material composition. The content of the rare-earth element(s) oxide other than the cerium oxide content in the second phase is between 5 and 50 wt. %.

According to one embodiment both phases add up to 100 wt. %.

The composition includes two distinct crystalline phases that are homogenously distributed amongst each other.

More precisely, the first and second phases are distinguishable by powder XRD.

Furthermore, no agglomerated particles larger than 10 μm, preferably larger than 5 μm containing only one of the phases can be observed by scanning electron microscopy (SEM) combined with an EDX detector.

First Phase—Mg/Al Mixed Oxide

At least 50 wt. % of the support material composition is made up of the first phase which may Include spinel $MgAl_2O_4$, alumina, and MgO, preferably spinel ($MgAl_2O_4$), and alumina.

The first phase of the composition can be derived by calcination of a suitable Mg/Al mixed oxide precursor that is prepared by known methods in the art of the Invention, i.e. by hydrolysis of a mixture of corresponding alkoxides of magnesium and aluminium yielding a mixture of hydrotalcite, and boehmite. A preferred Mg/Al mixed oxide precursor is prepared by the method described in DE19503522 (incorporated herein by reference).

The amount of magnesium within the first phase is more preferably in the range of 1 to 30 wt. %, preferably 5 to 30% wt. %, calculated as MgO based on the weight of the first phase.

The combined amounts of the compounds of Cerium and rare-earth element(s) other than cerium in the first phase of the support material composition, calculated as their oxides, are preferably less than 5 wt. %, more preferably less than 2 wt. % and most preferably about 0 wt. %, relative the support material (=100 wt. %). Meaning that all of the remaining amounts of the oxides/compounds of Cerium and the rare-earth element(s) other than cerium are in the second phase of the support material.

It was found that the metals compounds suspended in the aqueous suspension of step i) form the first phase. The combined amounts of the compounds of Cerium and of rare-earth element(s) other than cerium in the aqueous suspension of step i), calculated as their oxides, are preferably less than 5 wt. %, more preferably less than 2 wt. % and most preferably about 0 wt. %, relative to the oxides of Magnesium and Aluminum in the aqueous mixture (=100 wt. %). In a preferred embodiment the aqueous suspension of step i) does not comprise any compound of a rare-earth element (including no cerium compound).

Second Phase—Cerium Based Oxide and at Least One Rare Earth Elements(s) Oxide Other than Cerium Oxide The second phase preferably is a solid-solution of a cerium based oxide with one or more rare-earth element(s) based oxides other than cerium. The rare-earth element(s) oxides other than cerium include La, Pr, Nd, Y or combinations thereof. The content of the rare-earth element(s) oxide other than cerium oxide in the second phase is between 5 and 50 wt. %, preferably between 10 and 35 wt. %, calculated as the rare earth element(s) oxide other than cerium relative to the total second phase.

The combined amounts of the compounds of Magnesium and Aluminum in the second phase of the support material composition, calculated as MgO and $Al_2O_3$, are preferably less than 5 wt. %, more preferably less than 2 wt. % and most preferably about 0 wt. %, relative to the support material (=100 wt. %). Meaning that all of the remaining amounts of the oxides/compounds of Magnesium and Aluminum are in the first phase of the support material.

It was found that the metal salts in the aqueous solution of step ii) and step iii) form the second phase (in the form of their oxides). The combined amounts of compounds of Magnesium and Aluminum in the combined aqueous solutions of step ii) and step iii) are preferably less than 5 wt. %, more preferably less than 2 wt. %, and most preferably about 0 wt. %, relative to the Cerium and of rare-earth element(s) other than cerium in the aqueous mixture (=100 wt. %), each calculated as their oxides. In a preferred embodiment the aqueous solutions of step ii) and step iii) do not comprise any Magnesium or Aluminum compound or Magnesium or Aluminum metal.

As a consequence, the unit cell volume of the second phase is adjusted compared to cerium based oxides according to Vegard's law, resulting in a shift of the d-value of the $CeO_2$ (111) reflection in the XRD pattern. Additionally, the solid-solution could for example be identified by Raman spectroscopy or related spectroscopic methods. In other words, no separate rare-earth element(s) based oxides containing phases different from the second phase can be detected in the powder XRD of the inventive support material composition. That means that all of the rare earth element(s) based oxide that is contained in the second phase forms part of the solid-solution.

Therefore, the stabilizing effect on the cerium oxide is maximized in the Inventive support material composition by incorporating all the rare-earth element(s) based oxides of the second phase, forming the solid-solution. The stabilizing effect of this is, for example, revealed by a reduced crystal size of the second phase, as determined by Scherrer-method utilizing the (111) reflection of the cubic $CeO_2$ structure. In particular, the crystal size of the second phase after a thermal treatment of the composition at 950° C. for 3 h is preferably less than 10 nm.

Furthermore, it is shown that the support material composition of the present invention has a higher low temperature NOx storage capacity determined at 150° C. and 200° C. after a thermal treatment at 950° C. for 3 h when compared to state of the art materials without the second phase described above. This clearly reflects the enhanced thermal stability of the low temperature NOx storage function of the inventive compositions.

A fourth aspect of the invention is the use of the support material composition according to the second or third aspect of the invention as a nitrogen oxide storage component within a catalyst for treating exhaust gases to reduce the NOx content.

The support material composition according to the second, third and fourth aspect of the invention is optionally further characterized by the following parameters:

The support material composition typically has a surface area of above 50 $m^2/g$ and more preferably above 80 $m^2/g$.

The pore volume of the support material composition may be between 0.1 ml/g and 1.5 ml/g, more preferably between 0.4 and 1.0 ml/g. The pore volume is measured by $N_2$ adsorption.

The support material composition comprises a low amount of sodium and sulfur impurities. In particular, the support material composition comprises less than 500 ppm $Na_2O$, more preferably less than 100 ppm $Na_2O$ and preferably less than 100 ppm of sulfur (including compounds comprising sulfur).

The present invention relies on the following definitions:

By solution is meant a liquid mixture in which the minor component (the solute) is uniformly distributed within the major component (the solvent). The solvent and the solute form one phase. An aqueous solution is a solution comprising water as the solvent, preferably at least 50 wt. % water, relative to all the liquid components comprised in the solution.

By suspension is meant a liquid mixture in which particles are dispersed in a liquid. The liquid and the particles form two phases". An aqueous suspension is a suspension comprising water as the liquid phase, preferably at least 50 wt. % water, relative to all the liquid components comprised in the liquid phase.

The term "particulate material" as used herein, refers to particles in the form of a powder, beads, extrudate, and the like shaped particles.

The common oxidation state (used for the calculation of the amount of (metal) oxides) of Mg, Al, Ce, La, Pr, Nd and Y for calculating the wt. % values is MgO, $Al_2O_3$, $CeO_2$, $La_2O_3$, $PreO_{11}$, $Nd_2O_3$, $Sm_2O$ and $Y_2O_3$.

The term "solid-solution" refers to the condition that the rare-earth element(s) other than cerium share(s) one crystallographic site (4a Wyckoff position) with the cerium atoms within the cubic $CeO_2$ crystal structure.

Surface area and pore volume are measured with $N_2$ physisorption using typical volumetric devices like the Quadrasorb from Quantachrome at temperature of liquid nitrogen. The surface area is determined using BET theory (DIN ISO 9277:2003-05), while the pore volume is determined according to DIN 66131. The pore size range is between 0 to 5000 nm in pore radius. The term BET refers to the Brunauer-Emmett-Teller method for the determination of the specific surface area.

The invention will now be described with reference to the following non-limiting FIGURE and examples in which:

FIG. 1 represents the powder X-ray diffraction pattern of the support material composition of Example 1 together with the theoretical patterns of $MgAl_2O_4$ (dotted lines) and $CeO_2$ (straight lines) showing the distinguishable first and second phases of the support material composition and the absence of any other constituents.

EXAMPLES

NOx Storage Capacity Measurements

Samples were treated at 950° C. for 3 h in an air atmosphere before determining the NOx storage capacity.

The NOx storage/release tests were performed in a fixed-bed reactor. The gas flows were controlled by mass flow controllers. The gas composition was continuously monitored by specific NDIR-UV gas analyzers for NO, $NO_2$, CO, $CO_2$, and $O_2$, and the measurement data are recorded every 10 seconds. 100 mg of sample mixed with 300 mg SiC were used for every experiment. Upstream, 80 mg of commercial Pt catalyst were placed in order to adjust the $NO_2/NO$ ratio to the realistic value according to the measurement temperature. The sample was heated under nitrogen from room temperature to the adsorption temperature of 150° C. or 200° C. respectively at 10° C./min.

Then the nitrogen gas flow was replaced by 500 ppm $NO+5\% O_2/N_2$ at 500 ml/min until the outlet NOx concentration reaches a value close to that of the calibration. NOx desorption was carried out by changing to nitrogen gas flow and heating at 5° C./min from 150° C. or 200° C. respectively to 700° C. The amount of released NOx is determined and defined to be the NOx storage capacity.

Comparative Example 1

An aqueous suspension of mixed Mg/Al oxide precursor (Pural MG20, MgO content of 20 wt. %) was mixed with a cerium acetate solution. After spray drying, the resulting powder was calcined at 950° C. for 3 h to obtain the cerium oxide doped homogenous Mg/Al mixed oxide.

Example 1

An aqueous suspension of mixed Mg/Al oxide precursor (Pural MG20, MgO content of 20 wt. %) was mixed with a pre-mixed solution of cerium acetate and lanthanum acetate. After spray drying, the resulting powder was calcined at 950° C. for 3 h to obtain the cerium oxide/lanthanum doped homogenous Mg/Al mixed oxide.

The powder X-ray diffraction together with the theoretical patterns of $CeO_2$ (straight lines) and $MgAl_2O_4$ (dotted lines) shown in FIG. 1, reveals two separate phases, a first phase comprising a Mg/Al mixed oxide, and a second phase comprising cerium oxide and lanthanum oxide.

Example 2

The same procedure as Example 1 was used but Nd acetate was pre-mixed with the cerium acetate as opposed to lanthanum acetate.

Example 3

The same procedure as Example 1 was used but Y acetate was pre-mixed with the cerium acetate as opposed to lanthanum acetate.

NOx storage was tested at 200° C. The results are included in Table 1:

TABLE 1

| | Wt. % Second Phase | Wt. % rare-earth oxide in Second Phase | Crystal size (nm) | d-value (Å) | NOx storage capacity (mg NOx/g) |
|---|---|---|---|---|---|
| Comparative Example 1 | 10 | — | 11.1 | 3.1273 | 4.14 |
| Example 1 | 12 | 33% $La_2O_3$ | 8.3 | 3.1406 | 9.15 |
| Example 2 | 10 | 30% $Nd_2O_3$ | 6.8 | 3.1383 | 9.6 |
| Example 3 | 9.6 | 25% $Y_2O_3$ | 6.5 | 3.1310 | 7.08 |

TABLE 1-continued

| | Wt. % Second Phase | Wt. % rare-earth oxide in Second Phase | Crystal size (nm) | d-value (Å) | NOx storage capacity (mg NOx/g) |
|---|---|---|---|---|---|

The Examples dearly show that the support material composition of the present invention have a higher NOx storage capacity than the Comparative Example at 200° C.

Comparative Example 2

An aqueous suspension of mixed Mg/Al oxide precursor (Pural MG20, MgO content of 20 wt. %) was mixed with a cerium acetate solution. After spray drying, the resulting powder was calcined at 950° C. for 3 h.

Example 4

An aqueous suspension of mixed Mg/Al oxide precursor (Pural MG20, MgO content of 20 wt. %) was mixed with a mixed solution of cerium acetate and lanthanum acetate. After spray drying, the resulting powder was calcined at 950° C. for 3 h.

Example 5

The same procedure as Example 4 was used but Pr acetate was pre-mixed with the cerium acetate as opposed to lanthanum acetate.

Example 6

The same procedure as Example 4 was used but Pr acetate was pre-mixed with the cerium acetate as opposed to lanthanum acetate.

NOx storage was tested at 150° C. The results are included in Table 2.

TABLE 2

| | Wt. % Second Phase | Wt. % rare-earth oxide in Second Phase | $CeO_2$ Crystal size (nm) | d-value (Å) | NOx storage capacity (mg NOx/g) |
|---|---|---|---|---|---|
| Comparative Example 2 | 20 | 0 | 10 | 3.1308 | 4.95 |
| Example 4 | 20 | 25% $La_2O_3$ | 7 | 3.1435 | 5.61 |
| Example 5 | 20 | 25% $Pr_6O_{11}$ | 8 | 3.1341 | 5.19 |
| Example 6 | 20 | 10% $Pr_6O_{11}$ | 8.4 | 3.1322 | 6.42 |

Again, the Examples clearly show that the support material composition of the present invention have a higher NOx storage capacity than the Comparative Example at 150° C.

The invention claimed is:

1. A method of preparing a support material composition, the composition comprising two phases:
   a first phase comprising a Mg/Al mixed oxide; and
   a second phase comprising a cerium based oxide, and rare-earth element(s) based oxide other than cerium oxide, wherein the second phase is a solid-solution;
   the method comprising the following steps:
   i) preparing an aqueous suspension of a Mg/Al mixed oxide precursor;
   ii) preparing an aqueous solution of a cerium salt;

iii) preparing an aqueous solution of one or more rare-earth element salt(s) other than cerium salt;

iv) combining, in any order, at least the aqueous suspension in step i), with the aqueous solution in step ii), and the aqueous solution of step iii) to form an aqueous mixture;

v) dying the aqueous mixture to form a dried particulate material; and vi) calcining the dried particulate material;

wherein the content of the one or more rare-earth element salt(s) other than cerium salt is between 5 and 50 wt. %, relative to the sum of the cerium salt from the aqueous solution of step ii) and the one or more rare earth element salt(s) other than cerium salt from the aqueous solution of step iii) and, wherein each of the salts are calculated as their oxides.

2. The method of claim 1, wherein the Mg/Al mixed oxide precursor is prepared by hydrolysis of a mixture of corresponding alkoxides of aluminium and magnesium that form a mixture of hydrotalcite, boehmite, and water.

3. The method of claim 1, wherein the cerium salt comprises one or more of cerium nitrate, ammonium cerium nitrate, cerium sulfate, cerium carbonate, and cerium acetate.

4. The method of claim 1, wherein the rare-earth element salt(s) other than cerium salt comprises salts of La, Pr, Nd, Y, Sm or mixtures thereof.

5. The method of claim 4, wherein the rare earth element salt(s) is an acetate of La, Pr, Nd, Y or mixtures thereof.

6. The method of claim 1, wherein the solutions of step ii) and step iii) are first combined, and then combined with the suspension of step i).

7. The method of claim 1, wherein the mixture of the suspension and the solutions is spray dried to form a particulate material.

8. The method of claim 1, wherein the particulate material is calcined at a temperature of between 500° C. and 1100° C., for a period of between 30 minutes and 5 hours to obtain the support material composition.

9. A support material composition prepared according to the method of claim 1, the support material composition comprising two phases:

a first phase comprising a Mg/Al mixed oxide; and a second phase comprising a cerium based oxide, and rare-earth element(s) based oxide other than cerium oxide, wherein the second phase is a solid-solution, wherein the content of the rare-earth element(s) oxide other than cerium oxide in the second phase is between 10 and 35 wt. %, calculated as the rare earth element(s) oxide other than cerium oxide relative to the total second phase.

10. The support material composition of claim 9 comprising a BET surface area of above 50 $m^2/g$.

11. The support material composition of claim 9 comprising a pore volume between 0.1 and 1.5 ml/g.

12. The support material composition of claim 9 comprising less than 500 ppm $Na_2O$.

13. Use of the support material composition of claim 9 as a nitrogen oxide storage component within a catalyst for treating exhaust gases to reduce the NOx content.

14. A support material composition comprising two phases:

i) a first phase comprising a Mg/Al mixed oxide; and ii) a second phase comprising a cerium based oxide, and rare-earth element(s) based oxide other than cerium oxide, wherein the second phase is a solid-solution;

the content of the first phase being at least 50 wt. % of the total support material composition, wherein the amount of Mg in the first phase is between 1 and 40 wt. %, calculated as MgO based on the weight of the first phase, calculated as MgO and $Al_2O_3$; and wherein the content of the rare-earth element(s) oxide other than cerium oxide in the second phase is between 10 and 35 wt. %, calculated as the rare earth element(s) oxide other than cerium oxide relative to the total second phase.

15. The support material composition of claim 14 comprising a BET surface area of above 50 $m^2/g$.

16. The support material composition of claim 14 comprising a pore volume between 0.1 and 1.5 ml/g.

17. The support material composition of claim 14 comprising less than 500 ppm $Na_2O$.

* * * * *